(12) United States Patent
Lee

(10) Patent No.: US 12,613,098 B2
(45) Date of Patent: Apr. 28, 2026

(54) METHOD AND APPARATUS FOR MATCHING SHIP MAP AND HARBOR MAP

(71) Applicant: LKSYS Inc., Seoul (KR)

(72) Inventor: Huiwon Lee, Seoul (KR)

(73) Assignee: LKSYS Inc., Seoul (KR)

( * ) Notice: Subject to any disclaimer, the term of this patent is extended or adjusted under 35 U.S.C. 154(b) by 107 days.

(21) Appl. No.: 18/716,149

(22) PCT Filed: Jun. 30, 2022

(86) PCT No.: PCT/KR2022/009424
§ 371 (c)(1),
(2) Date: Jun. 4, 2024

(87) PCT Pub. No.: WO2023/106530
PCT Pub. Date: Jun. 15, 2023

(65) Prior Publication Data
US 2025/0035445 A1 Jan. 30, 2025

(30) Foreign Application Priority Data
Dec. 7, 2021 (KR) ......................... 10-2021-0173475

(51) Int. Cl.
*G01C 21/00* (2006.01)
*G01C 21/20* (2006.01)
(Continued)

(52) U.S. Cl.
CPC ............. *G01C 21/203* (2013.01); *G08G 3/00* (2013.01); *B63B 2035/006* (2013.01); *G01C 21/20* (2013.01)

(58) Field of Classification Search
CPC ........ G05D 1/02; G05D 1/0206; B63B 35/00; B63B 2035/006; G01C 21/20; G01C 21/00
See application file for complete search history.

(56) References Cited

U.S. PATENT DOCUMENTS

| | | | |
|---|---|---|---|
| 11,675,089 B2 * | 6/2023 | Bennett ................... | G01S 19/48 |
| | | | 455/456.1 |
| 2008/0079608 A1 * | 4/2008 | Morrell .................... | G08G 3/00 |
| | | | 340/984 |

(Continued)

FOREIGN PATENT DOCUMENTS

| | | | |
|---|---|---|---|
| CN | 106507908 B | * | 11/2011 |
| CN | 102351039 A | * | 2/2012 |

(Continued)

OTHER PUBLICATIONS

An English-translated version of CN 111676893 A by Ren-lin Qin (Year: 2020).*

(Continued)

*Primary Examiner* — Cuong H Nguyen
(74) *Attorney, Agent, or Firm* — Revolution IP, PLLC

(57) ABSTRACT

The present embodiment provides a method and an apparatus for matching a ship map of a moving ship and a harbor map of a harbor terminal, capable of connecting the ship map to the harbor map, in transferring an autonomous driving vehicle using a ship from a harbor to another harbor, in order to use the harbor map and the ship map, similarly to control of the autonomous driving vehicle on a road.

5 Claims, 8 Drawing Sheets

*110*

*120*

*130*

MAP MATCHING APPARATUS

(51) Int. Cl.
G01G 3/00 (2006.01)
G08G 3/00 (2006.01)
B63B 35/00 (2020.01)

(56) References Cited

U.S. PATENT DOCUMENTS

| | | | | |
|---|---|---|---|---|
| 2018/0210087 A1* | 7/2018 | Olson | ..................... | G01S 17/42 |
| 2021/0070407 A1* | 3/2021 | Ishii | ........................ | B63B 79/10 |

FOREIGN PATENT DOCUMENTS

| | | | | | | |
|---|---|---|---|---|---|---|
| CN | 210014757 | U | * | 2/2020 | | |
| CN | 111676893 | A | * | 9/2020 | ............. | E02B 3/068 |
| CN | 113296131 | A | * | 8/2021 | ............. | G01S 19/37 |
| CN | 119898452 | B | * | 6/2025 | ............. | B63B 21/00 |
| CN | 120373555 | A | * | 7/2025 | ........... | G06F 18/214 |
| CN | 120853420 | A | * | 10/2025 | ............... | G08G 3/00 |
| KR | 10-2006-0072293 | A | | 6/2006 | | |
| KR | 20060072293 | A | * | 6/2006 | ............. | B63H 21/21 |
| KR | 10-2011-0113029 | A | | 10/2011 | | |
| KR | 20110113029 | A | * | 10/2011 | ............. | G08C 17/02 |
| KR | 101314566 | B1 | * | 10/2013 | ............... | G08G 5/54 |

| | | | | | |
|---|---|---|---|---|---|
| KR | 10-2016-0001271 | A | | 1/2016 | |
| KR | 10-2019-0067430 | A | | 6/2019 | |
| KR | 10-1987401 | B1 | | 6/2019 | |
| KR | 102188567 | B1 | * | 12/2020 | .......... G08G 1/0967 |

OTHER PUBLICATIONS

An English-translated version of CN 106507908 B by Hong-hai Wu (Year: 2011).*
Clunie, Thomas, et al. "Development of a perception system for an autonomous surface vehicle using monocular camera, lidar, and marine radar." 2021 IEEE International Conference on Robotics and Automation (ICRA). IEEE,. (Year: 2021).*
Raap, Lucas JCW. "From Smart to Dark: Developing a Maturity Model for Next-Generation Warehouses.". (Year: 2025).*
An English-translated version of document CN-113296131-A "Ship and positioning method and device of ship loader" by Guoneng Huanghua Port Co ltd. (Year: 2021).*
An English-translated version of document KR101314566B1 by Lee et al (Year: 2013).*
International Search Report of PCT/KR2022/009424 mailed Sep. 21, 2022 from Korean Intellectual Property Office.

* cited by examiner

[FIG. 1A]
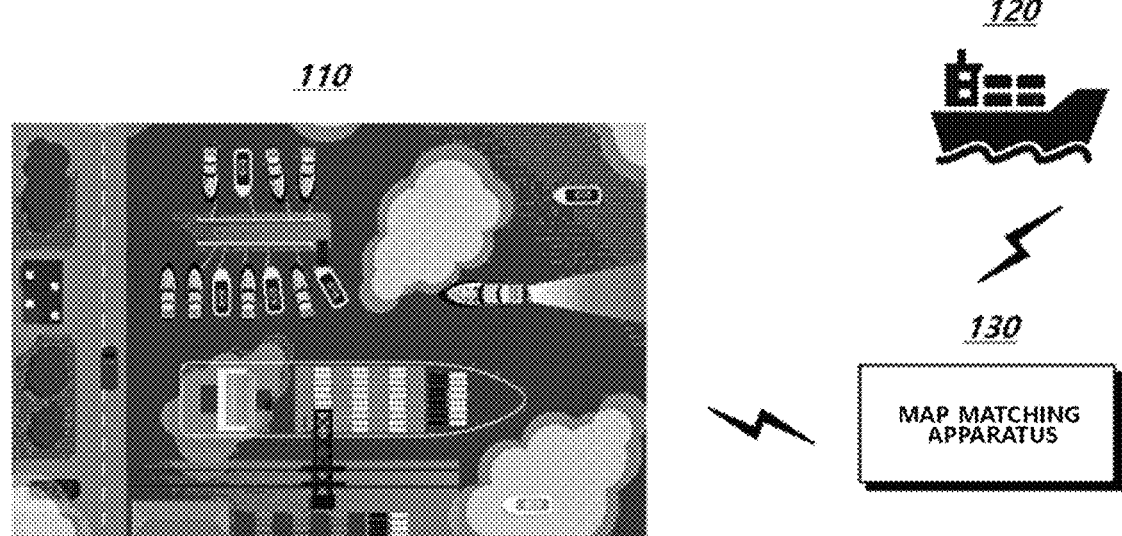

[FIG. 1B]
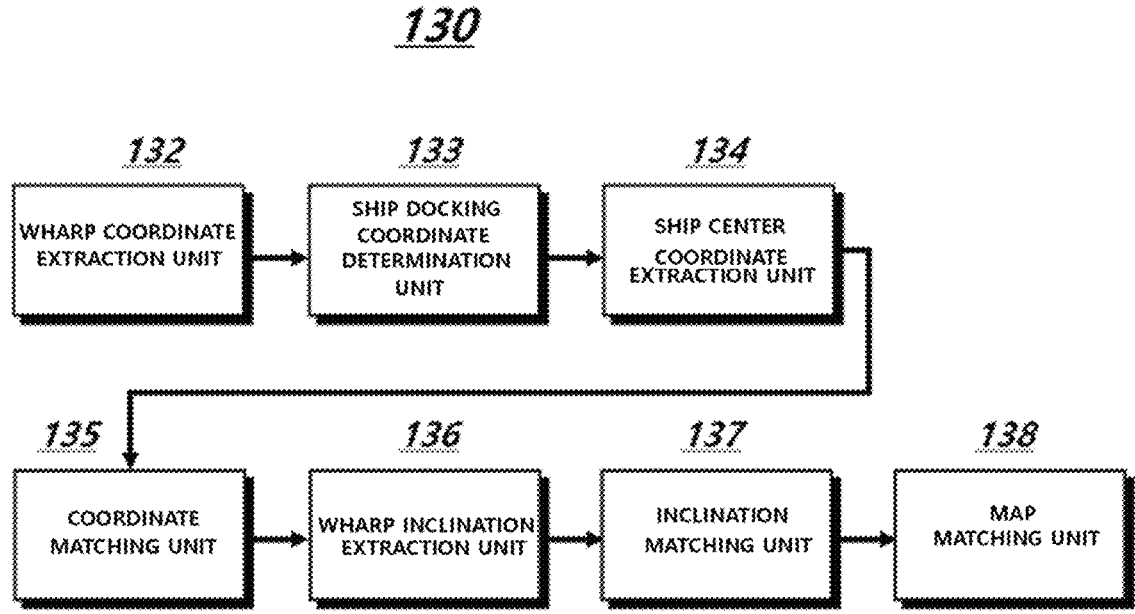

[FIG. 2]
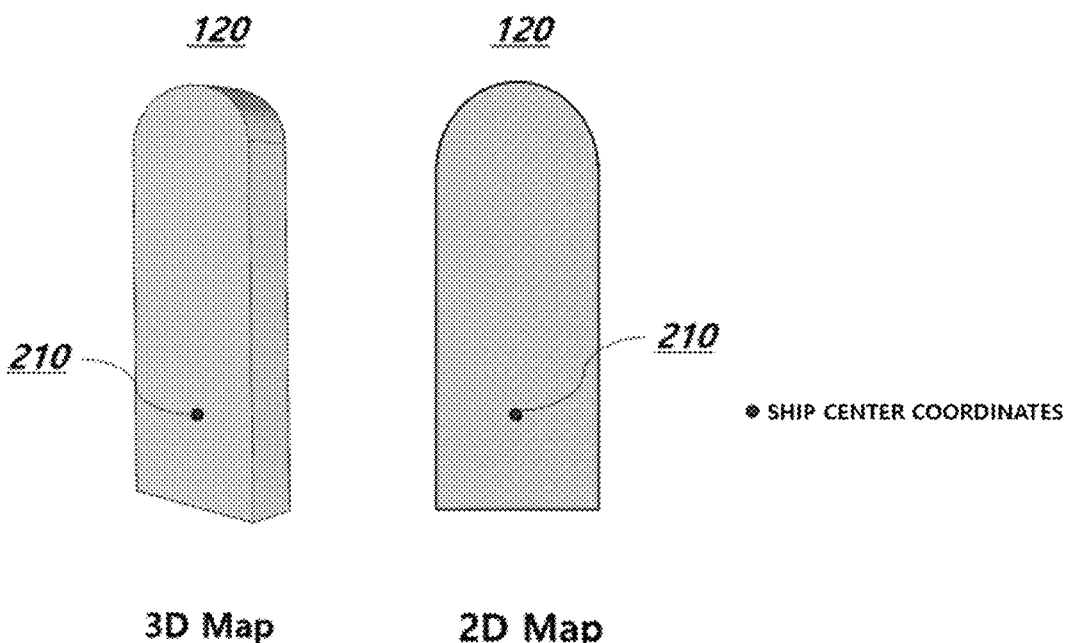
*120*                                      *120*
*210*                              *210*
● SHIP CENTER COORDINATES
3D Map                    2D Map

[FIG. 3]
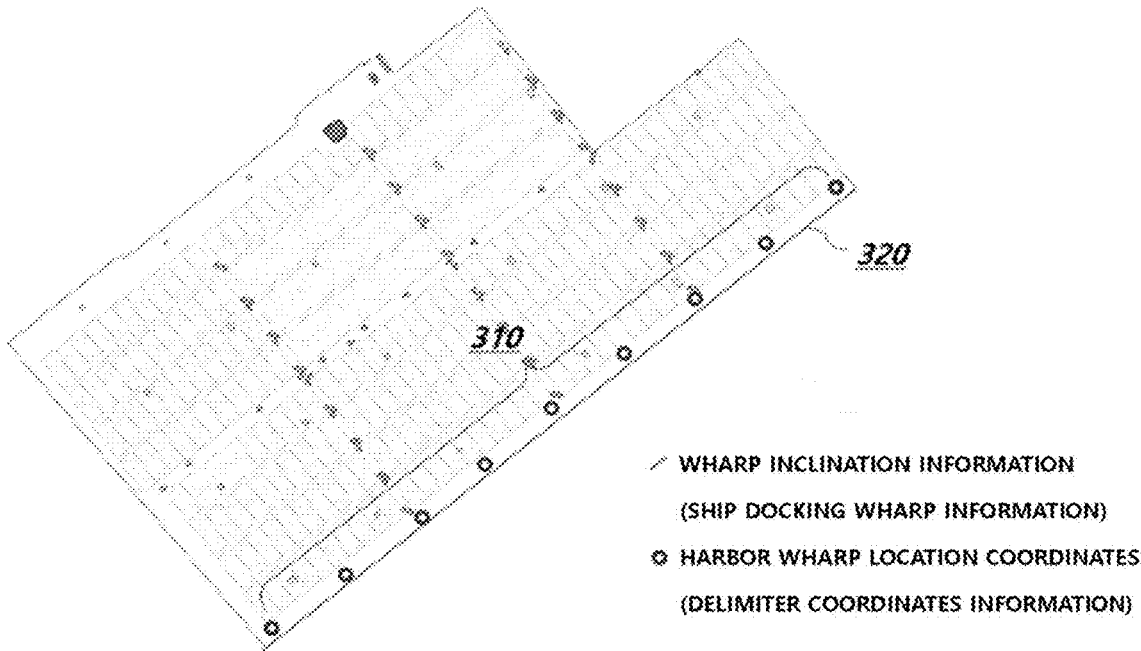
_ WHARP INCLINATION INFORMATION
  (SHIP DOCKING WHARP INFORMATION)
o HARBOR WHARP LOCATION COORDINATES
  (DELIMITER COORDINATES INFORMATION)

[FIG. 4]
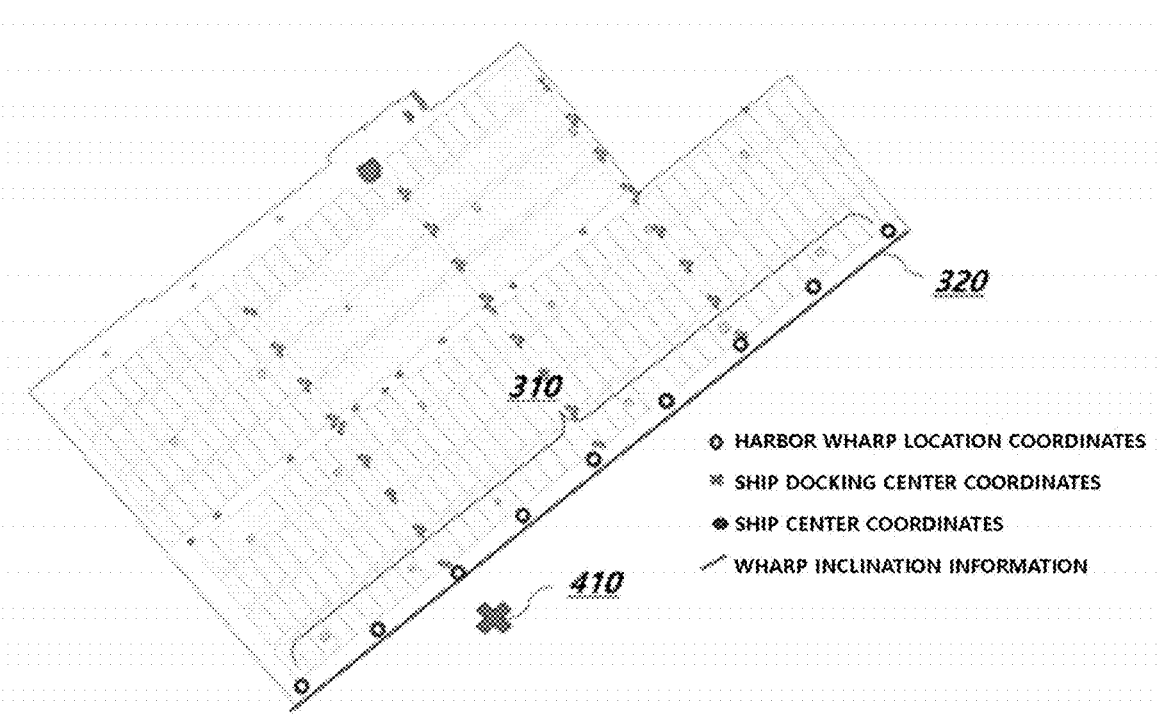
320
310
410
◇ HARBOR WHARP LOCATION COORDINATES
✳ SHIP DOCKING CENTER COORDINATES
✦ SHIP CENTER COORDINATES
╱ WHARP INCLINATION INFORMATION

[FIG. 5]
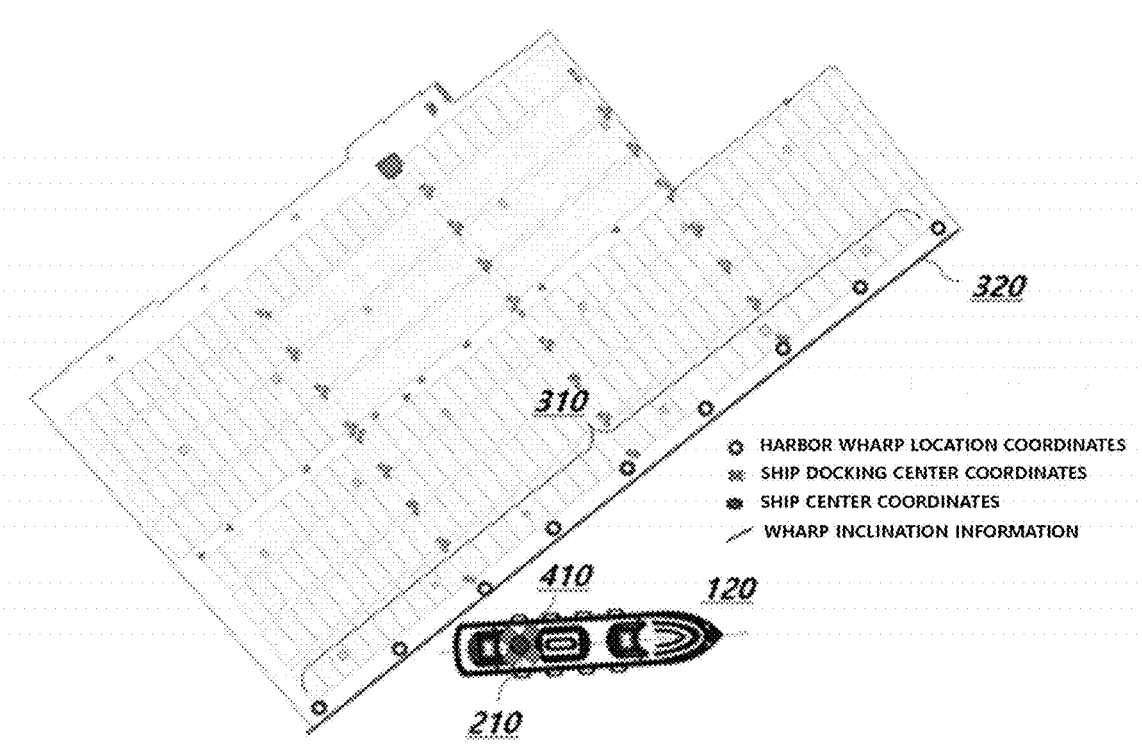
320
310
HARBOR WHARP LOCATION COORDINATES
SHIP DOCKING CENTER COORDINATES
SHIP CENTER COORDINATES
WHARP INCLINATION INFORMATION
410      120
210

[FIG. 6]
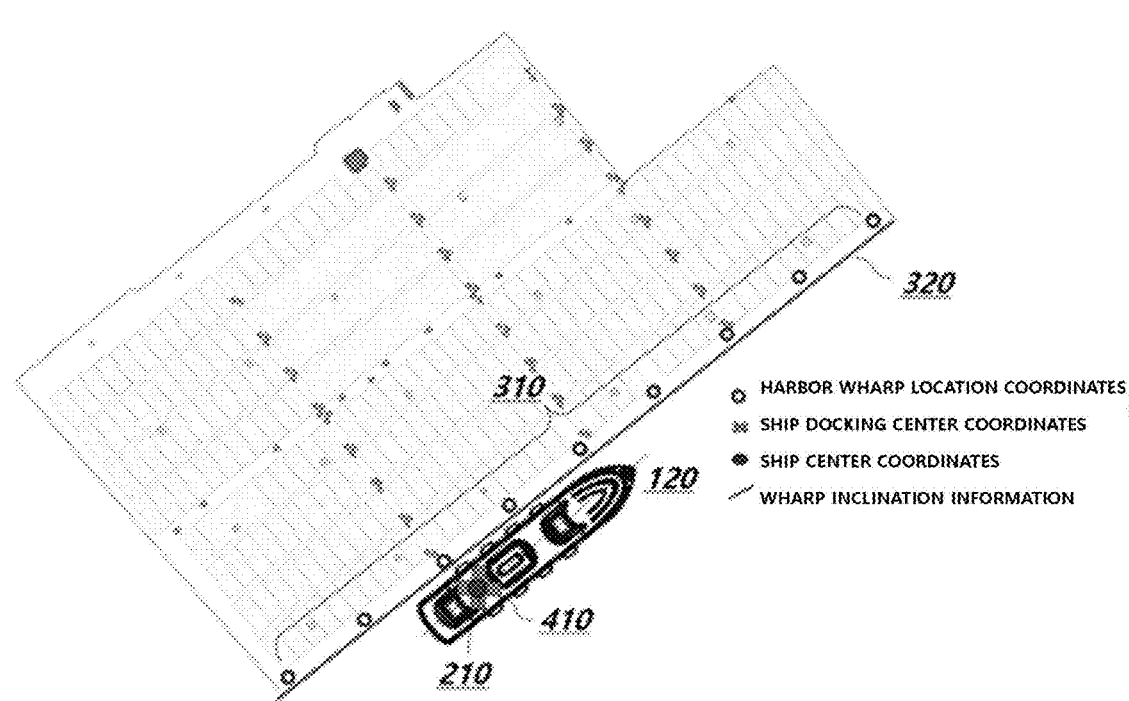
HARBOR WHARP LOCATION COORDINATES
SHIP DOCKING CENTER COORDINATES
SHIP CENTER COORDINATES
WHARP INCLINATION INFORMATION

[FIG. 7]
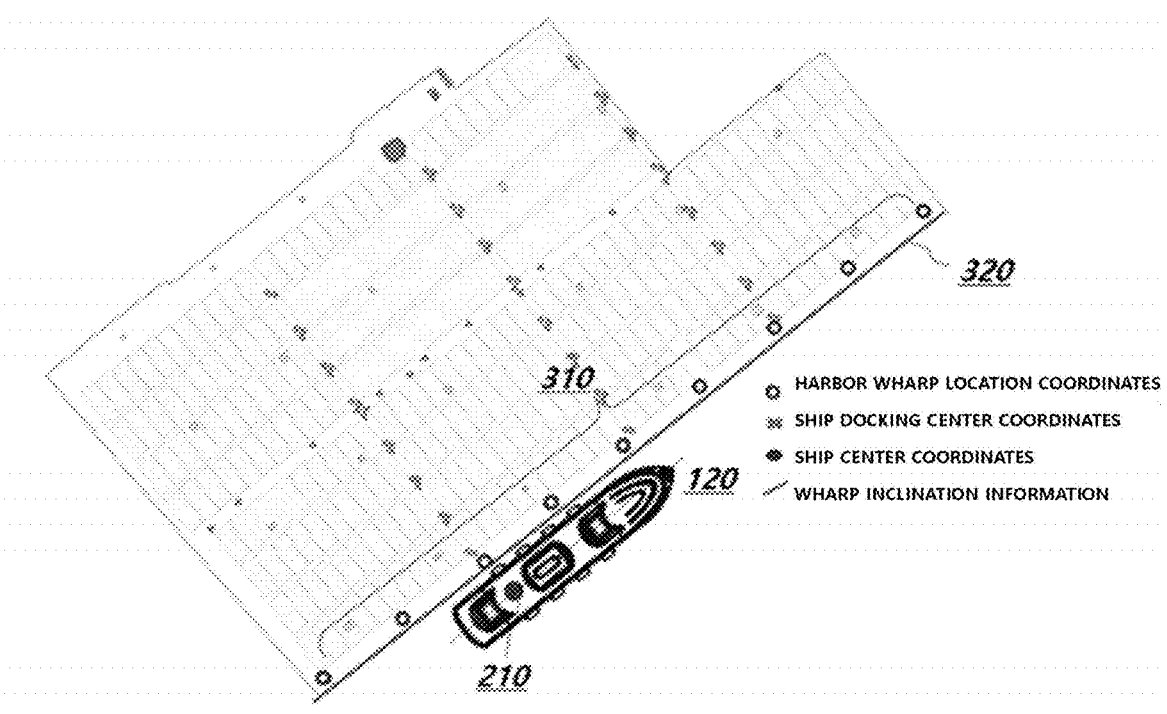

METHOD AND APPARATUS FOR MATCHING SHIP MAP AND HARBOR MAP

TECHNICAL FIELD

The present invention relates to a method and an apparatus for matching a ship map and a harbor map.

BACKGROUND ART

The content described below simply provides background information related to the present invention, and does not disclose prior art information.

An autonomous driving system is a system capable of performing automatic driving to a predetermined destination by recognizing a surrounding situation and a vehicle status without a driver's intention. The autonomous driving system includes recognition, decision-making, path planning, and vehicle control. In the path planning, changes of obstacles are detected to generate an avoidance path in real time, in which vehicle's kinematic movement characteristics are reflected.

In particular, in order to generate a stable driving path in the path planning, it should be considered that, in a case where an autonomous driving vehicle attempts to change lanes in urban areas, congested sections, or highways where obstacles change in real time, various dangerous situations may occur due to collision with surrounding moving obstacles. In this regard, techniques for generating a driving path that allows an autonomous driving vehicle to change lanes stably have been proposed.

In general, an autonomous driving vehicle recognizes lanes on both sides of vehicle's travelling lane, and travels at the center of both the recognized lanes. Here, the autonomous driving vehicle generates candidate paths within the road in consideration of surrounding vehicles or obstacles, and in order to avoid collision with the vehicles or obstacles and secure safety, the autonomous driving vehicle selects a local path within a range without deviating from the lanes (boundaries of the traveling lane), thereby traveling while deviating from the center of the lanes.

In general, in order for a vehicle to be shipped on a ship after being delivered from a factory, first, a person should drive a transport vehicle on which the vehicle is loaded to a vehicle shipping depot. Secondly, the person should personally drive the vehicle loaded on the transport vehicle to a vehicle shipping waiting place. Thirdly, the person should personally drive the vehicle from the vehicle shipping waiting place to the ship to ship the vehicle.

DISCLOSURE

Technical Problem

The present invention has been made in an effort to solve the above-described problems associated with prior art, and an object of the present invention is to provide a method and an apparatus for matching a ship map of a moving ship and a harbor map of a harbor terminal, capable of connecting the ship map to the harbor map, in transferring an autonomous driving vehicle using a ship from a harbor to another harbor, in order to use the harbor map and the ship map, similarly to control of the autonomous driving vehicle on a road.

Technical Solution

In accordance with an aspect of the present invention, there is provided a map matching apparatus including a wharf coordinate extraction unit that extracts coordinates of a plurality of harbor wharf locations from a harbor map in conjunction with a harbor terminal, a ship docking coordinate determination unit that determines ship docking center coordinates on the basis of the coordinates of the plurality of harbor wharf locations, a ship center coordinate extraction unit that extracts ship center coordinates on the basis of a ship map in conjunction with a ship, a coordinate matching unit that matches the ship docking center coordinates and the ship center coordinates, and a map matching unit that matches the harbor map and the ship map in a case where it is confirmed that the ship docking center coordinates match the ship center coordinates.

In accordance with another aspect of the present invention, there is provided a map matching method including extracting coordinates of a plurality of harbor wharf locations from a harbor map in conjunction with a harbor terminal, determining ship docking center coordinates on the basis of the coordinates of the plurality of harbor wharf locations, extracting ship center coordinates on the basis of a ship map in conjunction with a ship, matching the ship docking center coordinates and the ship center coordinates, and matching the harbor map and the ship map in a case where it is confirmed that the ship docking center coordinates match the ship center coordinates.

Advantageous Effects

As described above, according to the present invention, it is possible to connect a ship map of a moving ship to a harbor map of a harbor terminal, in transferring an autonomous driving vehicle is transferred using a ship from a harbor to another harbor, in order to use the harbor map and the ship map, similarly to control of the autonomous driving vehicle on a road.

DESCRIPTION OF DRAWINGS

FIGS. 1A and 1B are diagrams showing a map matching apparatus according to an embodiment of the present invention.

FIG. 2 is a diagram showing a configuration of a ship map according to an embodiment of the present invention.

FIG. 3 is a diagram showing a configuration of a terminal map according to an embodiment of the present invention.

FIG. 4 is a diagram showing a method for determining a ship docking location center to connect a ship map of a moving ship to a terminal map of a stationary terminal, according to an embodiment of the present invention.

FIG. 5 is a diagram showing a method for matching ship center coordinates to connect the ship map of the moving ship to the terminal map of the stationary terminal, according to the embodiment of the present invention.

FIG. 6 is a diagram showing a method for turning a ship by a wharf inclination with reference to the ship center coordinates to connect the ship map of the moving ship to the terminal map of the stationary terminal, according to the embodiment of the present invention.

FIG. 7 is a diagram showing a method for matching a ship map of a moving ship and a terminal map of a stationary terminal according to an embodiment of the present invention.

REFERENCE SINS LIST

110: HARBOR TERMINAL
120: SHIP

130: MAP MATCHING APPARATUS
132: WHARF COORDINATE EXTRACTION UNIT
133: SHIP DOCKING COORDINATE DETERMINATION UNIT
134: SHIP CENTER COORDINATE EXTRACTION UNIT
135: COORDINATE MATCHING UNIT
136: WHARF INCLINATION EXTRACTION UNIT
137: INCLINATION MATCHING UNIT
138: MAP MATCHING UNIT

BEST MODE

Hereinafter, reference will be made in detail to various embodiments of the present invention, examples of which are illustrated in the accompanying drawings and described below.

FIGS. 1A and 1B are diagrams showing a map matching apparatus according to an embodiment of the present invention.

In transferring an autonomous driving vehicle from one harbor to another harbor using a ship, a harbor map and a ship map are used, similar to control of the autonomous driving vehicle on a road. A map matching apparatus 130 according to the present embodiment connects a ship map (including a 2D map and a 3D map) of a moving ship 120 to a harbor map of a harbor terminal 110.

The map matching apparatus 130 is operated in conjunction with the ship 120 to have ship center coordinates ('•') as attribute information on a center point for all coordinates of the ship 120 in configuring the ship coordinates. The map matching apparatus 130 is operated in conjunction with the harbor terminal 110 to have attribute information ('/') on an inclination value (inclination) of a wharf where the ship 120 docks. In a case where a ship docking location 'X' is determined, the map matching apparatus 130 moves the ship coordinate center '•' of the ship 120, and generates a map connected through rotation transformation as much as the terminal wharf inclination information '/'.

The map matching apparatus 130 according to the present embodiment includes a wharf coordinate extraction unit 132, a ship docking coordinate determination unit 133, a ship center coordinate extraction unit 134, a coordinate matching unit 135, a wharf inclination extraction unit 136, an inclination matching unit 137, and a map matching unit 138. The components included in the map matching apparatus 130 are not necessarily limiting.

The respective components included in the map matching apparatus 130 may be connected to a communication path connecting software modules or hardware modules within the apparatus, and may operate in combination with each other. These components perform communication using one or more communication buses or signal lines.

Each component of the map matching apparatus 130 shown in FIG. 1B represents a unit that processes at least one function or operation, and may be implemented as a software module, a hardware module, or a combination of software and hardware.

The wharf coordinate extraction unit 132 extracts coordinates 310 of a plurality of harbor wharf locations from the harbor map in conjunction with the harbor terminal 110.

The ship docking coordinate determination unit 133 determines ship docking center coordinates 410 on the basis of the coordinates 310 of the plurality of harbor wharf locations.

The ship docking coordinate determination unit 133 determines a location adjacent to one of the plurality of sets of harbor wharf location coordinates 310 as the ship docking center coordinates 410 on the basis of the plurality of sets of harbor wharf location coordinates 310.

The ship docking coordinate determination unit 133 selects only a wharf location where there is no information on a ship anchored nearby as candidate harbor wharf location coordinates on the basis of the coordinates 310 of the plurality of harbor wharf locations. The ship docking coordinate determination unit 133 determines, as a final wharf, a wharf having a space corresponding to the size of the ship 120 on the basis of the size of the ship among the candidate harbor wharf location coordinates. The ship docking coordinate determination unit 133 determines a location spaced apart from the final wharf by a preset distance as the ship docking center coordinates 410.

The ship center coordinate extraction unit 134 extracts ship center coordinates 210 on the basis of the ship map in conjunction with the ship 120.

The coordinate matching unit 135 matches the ship docking center coordinates and the ship center coordinates. The coordinate matching unit 135 transmits the ship docking center coordinates 410 to the ship 120, and causes the ship 120 to match the ship docking center coordinates and the ship docking center coordinates 410.

The wharf inclination extraction unit 136 extracts wharf inclination information corresponding to the final wharf determined among the coordinates 310 of the plurality of harbor wharf locations from the harbor map. The wharf inclination extraction unit 136 extracts wharf inclination information as an angle ranging from 0° to 359.9°.

The inclination matching unit 137 transmits the wharf inclination information corresponding to the final wharf to the ship 120, and causes the ship 120 to turn as much as the wharf inclination information.

The inclination matching unit 137 causes the ship 120 to match the ship docking center coordinates 410 and the ship center coordinates 210 in a state where the bow and the stern of the ship maintain a straight line on the basis of the wharf inclination information corresponding to the final wharf.

In a case where it is confirmed that the ship docking center coordinates match the ship center coordinates, the map matching unit 138 matches the harbor map and the ship map.

In a case where it is confirmed that the ship docking center coordinates 410 match the ship center coordinates 210 in a state where the ship 120 turns as much as the wharf inclination information, the map matching unit 138 matches the harbor map and the ship map.

The map matching unit 138 matches 2D coordinates of a 2D map and 3D coordinates of a 3D map, about a ship's contour in the ship map, at a 1:1 ratio. The map matching unit 138 matches 2D coordinates of a 2D map and 3D coordinates of a 3D map, about a harbor's contour of harbor facilities in the harbor map, at a 1:1 ratio.

The map matching unit 138 matches the 2D map of the ship's contour in the ship map and the 2D map of the harbor map at a 1:1 ratio. The map matching unit 138 matches the 3D map of the ship's contour in the ship map and the 3D map of the harbor map at a 1:1 ratio.

FIG. 2 is a diagram showing a configuration of a ship map according to an embodiment of the present invention.

Since the ship 120 is a moving object, it does not exist on stationary coordinates on the Earth, but the overall coordinates of the ship should be changed according to its moving position. The ship map includes the 2D map and the 3D map including 2D (x, y) and 3D (x, y, z) coordinates, respectively.

The 2D coordinates and the 3D coordinates of the ship's contour in the ship map are matched at a 1:1 ratio. The 2D coordinates and the 3D coordinates of the ship map have coordinate values for the same ship. The ship map includes ship center coordinates (center point coordinate values) such as '•' shown in FIG. 1.

FIG. 3 is a diagram showing a configuration of a terminal map according to an embodiment of the present invention.

The harbor terminal 110 is located inland, and accordingly, may be given stationary coordinates on the Earth. The harbor terminal 110 includes attribute information according to a location and an angle at which the ship 120 docks in the harbor map. The harbor map of the harbor terminal 110 includes the 2D map and the 3D map including 2D (x, y) coordinates and 3D (x, y, z) coordinates, respectively.

Since the harbor facilities exist at a stationary location on the Earth, the 2D map and 3D map of the harbor terminal 110 are matched at a 1:1 ratio in coordinates of the harbor's contour. The 2D map of the harbor terminal 110 includes information about a ship docking wharf, such as '/' shown in FIG. 3, that is, information about wharf inclination value (0° to 360°) (terminal wharf inclination information). The 2D map of the harbor terminal 110 includes delimiter coordinates information (terminal wharf location information) indicating in detail the ship docking wharf such as shown in FIG. 3.

FIG. 4 is a diagram showing a method for determining a ship docking location center to connect a ship map of a moving ship to a terminal map of a stationary terminal, according to an embodiment of the present invention.

The map matching apparatus 130 determines the ship docking location center (coordinates) 'X' for the ship to enter the harbor with reference to the wharf location information (coordinates) such as '⊙' shown in FIG. 4.

The map matching apparatus 130 extracts coordinates 310 of a plurality of harbor wharf locations from the harbor map in conjunction with the harbor terminal 110. The map matching apparatus 130 determines the ship docking center coordinates 410 on the basis of the coordinates 310 of the plurality of harbor wharf locations.

The map matching apparatus 130 determines a location adjacent to one of the coordinates 310 of the plurality of harbor wharf locations as the ship docking center coordinates 410 on the basis of the plurality of sets of harbor wharf location coordinates 310.

The map matching apparatus 130 selects only wharf location information where there is no information on a ship anchored nearby as candidate harbor wharf location coordinates on the basis of the coordinates 310 of the plurality of harbor wharf locations. The map matching apparatus 130 determines, as a final wharf, a wharf having a space corresponding to the size of the ship 120 on the basis of the size of the ship among the candidate harbor wharf location coordinates. The map matching apparatus 130 determines a location spaced apart from the final wharf by a preset distance as the ship docking center coordinates 410.

FIG. 5 is a diagram showing a method for matching a ship coordinate center to connect the ship map of the moving ship to the stationary terminal map, according to the embodiment of the present invention.

The map matching apparatus 130 matches the ship center coordinates '•' and the determined ship docking location center (coordinates) 'X'.

The map matching apparatus 130 matches the ship docking center coordinates and the ship center coordinates. The map matching apparatus 130 transmits the ship docking center coordinates 410 to the ship 120, and causes the ship 120 to match the ship docking center coordinates and the ship docking center coordinates 410.

FIG. 6 is a diagram showing a method for turning a ship by a wharf inclination with reference to the ship coordinate center to connect the ship map of the moving ship to the terminal map of the stationary terminal, according to the embodiment of the present invention.

The map matching apparatus 130 turns the ship as much as a wharf inclination with reference to the ship docking location center (coordinates) 'X' or the changed ship coordinates '•' using terminal wharf inclination information '/' (0° to 359.9°).

The map matching apparatus 130 extracts wharf inclination information corresponding to the determined final wharf among coordinates 310 of the plurality of harbor wharf locations from the harbor map. The map matching apparatus 130 extracts the wharf inclination information as an angle ranging from 0° to 359.9°.

The map matching apparatus 130 transmits the wharf inclination information corresponding to the final wharf to the ship 120, and causes the ship 120 to turn as much as the wharf inclination information.

The map matching apparatus 130 causes the ship 120 to match the ship docking center coordinates 410 and the ship center coordinates 210 in a state where the bow and the stern of the ship maintain a straight line on the basis of the wharf inclination information corresponding to the final wharf.

FIG. 7 is a diagram showing a method for matching a ship map of a moving ship and a terminal map of a stationary terminal according to an embodiment of the present invention.

The map matching apparatus 130 causes the moving ship 120 and the stationary harbor terminal 110 to be accurately represented in a single map centering around the harbor terminal 110. Then, the map matching apparatus 130 matches the 2D map and 3D map of the harbor terminal 110 or the ship 120 at a 1:1 ratio to complete the 2D map and the 3D map connected to each other.

In a case where it is confirmed that the ship docking center coordinates match the ship center coordinates, the map matching apparatus 130 matches the harbor map and the ship map.

In a case where it is confirmed that the ship docking center coordinates 410 match the ship center coordinates 210 in a state where the ship 120 turns as much as the wharf inclination information, the map matching apparatus 130 matches the harbor map and the ship map.

The map matching apparatus 130 matches the 2D coordinates of the 2D map and the 3D coordinates of the 3D map, about the ship's contour in the ship map, at a 1:1 ratio. The map matching apparatus 130 matches the 2D coordinates of the 2D map and the 3D coordinates of the 3D map, about the harbor's contour of harbor facilities in the harbor map, at a 1:1 ratio.

The map matching apparatus 130 matches the 2D map of the ship's contour in the ship map and the 2D map of the harbor map at a 1:1 ratio. The map matching apparatus 130 matches the 3D map of the ship's contour in the ship map and the 3D map of the harbor map at a 1:1 ratio.

The above description is merely an illustrative explanation of the technical idea of the present invention, and those skilled in the art will be able to make various modifications and variations in a range without departing from the concept of the invention. Accordingly, the present embodiments are not intended to limit the technical idea of the present invention, and the scope of the technical idea of the present invention is not limited by these embodiments. The scope of protection of the invention should be interpreted in accordance with the claims below, and all technical ideas equivalent to the invention should be interpreted as being included in the scope of the invention.

The invention claimed is:

1. A map matching apparatus for matching a ship map of a ship with a harbor map of a harbor terminal, comprising:

a memory storing the harbor map of the harbor terminal and the ship map of the ship; and a processor operatively coupled to the memory and configured to:

extract coordinates of a plurality of harbor wharf locations from the harbor map;

select, based on the coordinates of the plurality of harbor wharf locations, a final wharf among the harbor wharf locations that has no ship anchored nearby and has a space corresponding to a size of the ship;

determine ship docking center coordinates as a location spaced apart from the final wharf by a predetermined distance;

extract ship center coordinates from the ship map;

transmit the ship docking center coordinates to the ship and cause the ship to move such that the ship center coordinates coincide with the ship docking center coordinates;

extract wharf inclination information corresponding to the final wharf from the harbor map;

transmit the wharf inclination information to the ship and cause the ship to turn by an angle corresponding to the wharf inclination information; and match the harbor map and the ship map wherein it is confirmed that the ship docking center coordinates and the ship center coordinates match after the ship bas turned by the angle corresponding to the wharf inclination information.

2. The apparatus according to claim 1, wherein the wharf inclination extraction unit extracts the wharf inclination information as an angle ranging from 0° to 359.9°.

3. The apparatus according to claim 1, wherein the map matching unit matches 2D coordinates of a 2D map and 3D coordinates of a 3D map, about a ship's contour in the ship map, at a 1:1 ratio, and matches 2D coordinates of a 2D map and 3D coordinates of a 3D map, about a harbor's contour of harbor facilities in the harbor map, at a 1:1 ratio.

4. The apparatus according to claim 3, wherein the map matching unit matches the 2D map of the ship's contour in the ship map and the 2D map of the harbor map at a 1:1 ratio, and matches the 3D map of the ship's contour in the ship map and the 3D map of the harbor map at a 1:1 ratio.

5. A computer-implemented map matching method for matching a ship map of a ship with a harbor map of a harbor terminal, comprising:

extracting, from the harbor map of the harbor terminal, coordinates of a plurality of harbor wharf locations;

selecting, based on the coordinates of the plurality of harbor wharf locations and a size of the ship, a final wharf that has no ship anchored nearby and has a space corresponding to the size of the ship;

determining ship docking center coordinates as a location spaced apart from the final wharf by a predetermined distance;

extracting ship center coordinates from a digital ship map of the ship;

transmitting that the ship docking center coordinates to the ship and causing the ship to move such that the ship center coordinates coincide with the ship docking center coordinates;

extracting wharf inclination information corresponding to the final wharf from the harbor map;

transmitting the wharf inclination information to the ship and causing the ship to turn by an angle corresponding to the wharf inclination information; and matching the harbor map and the ship map upon confirming that the ship docking center coordinates and the ship center coordinates match after the ship has turned by the angle corresponding to the wharf inclination information.

* * * * *